(12) United States Patent
Shan et al.

(10) Patent No.: US 12,344,481 B2
(45) Date of Patent: Jul. 1, 2025

(54) APPARATUS FOR SORTING AND CONVEYING

(71) Applicant: BEIJING JINGDONG QIANSHI TECHNOLOGY CO., LTD., Beijing (CN)

(72) Inventors: Wenjun Shan, Beijing (CN); Guopeng Wang, Beijing (CN); Guoku Song, Beijing (CN); Mingfu Wu, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/042,608

(22) PCT Filed: Jan. 5, 2022

(86) PCT No.: PCT/CN2022/070375
§ 371 (c)(1),
(2) Date: Feb. 23, 2023

(87) PCT Pub. No.: WO2022/148384
PCT Pub. Date: Jul. 14, 2022

(65) Prior Publication Data
US 2023/0331493 A1  Oct. 19, 2023

(30) Foreign Application Priority Data
Jan. 6, 2021  (CN) .......................... 202110012667.3

(51) Int. Cl.
*B65G 23/06* (2006.01)
*B65G 17/06* (2006.01)
(Continued)

(52) U.S. Cl.
CPC .......... *B65G 23/06* (2013.01); *B65G 17/067* (2013.01); *B65G 17/345* (2013.01); *B65G 21/22* (2013.01)

(58) Field of Classification Search
CPC .... B65G 23/06; B65G 17/067; B65G 17/345; B65G 21/22
(Continued)

(56) References Cited

U.S. PATENT DOCUMENTS 3,837,508 A * 9/1974 Stefanelli ................ B60P 1/365
198/300
5,855,105 A * 1/1999 Ferris ...................... B65B 5/101
53/244

(Continued)

FOREIGN PATENT DOCUMENTS

CN  1131122 A  9/1996
CN  101434333 A  5/2009
(Continued)

OTHER PUBLICATIONS

International Search Report dated Mar. 25, 2022 of PCT International Application No. PCT/CN2022/070375.
(Continued)

*Primary Examiner* — Gene O Crawford
*Assistant Examiner* — Lester Rushin, III
(74) *Attorney, Agent, or Firm* — Qinghong Xu

(57) ABSTRACT

An apparatus for sorting and conveying, including: a cargo carrying assembly; a conveying assembly, configured to drive the cargo carrying assembly to move; where, the conveying assembly comprises a sprocket set and a chain drivingly connected to the sprocket set, the chain is pivotally connected with a roller, and the sprocket set is configured to be engaged with the roller to drive the cargo carrying assembly to move circularly; and a bearing assembly, dis-
(Continued)

posed adjacent to the sprocket set and configured to bear the roller in response to the roller to be engaged with or disengaged from the sprocket set.

18 Claims, 15 Drawing Sheets

(51) Int. Cl.
  *B65G 17/34* (2006.01)
  *B65G 21/22* (2006.01)
(58) Field of Classification Search
  USPC .................................................. 198/832, 778
  See application file for complete search history.

(56) References Cited

U.S. PATENT DOCUMENTS

| | | | | |
|---|---|---|---|---|
| 6,834,754 | B2 * | 12/2004 | Pietz | ........................ B66B 23/02 |
| | | | | 198/834 |
| 7,568,571 | B2 * | 8/2009 | Ogimura | ................ B65G 21/22 |
| | | | | 198/332 |
| 2005/0011734 | A1 | 1/2005 | Suzuki et al. | |
| 2015/0284188 | A1 | 10/2015 | Voigt | |

FOREIGN PATENT DOCUMENTS

| | | | |
|---|---|---|---|
| CN | 101607664 | A | 12/2009 |
| CN | 204507998 | U | 7/2015 |
| CN | 105936346 | * | 9/2016 |
| CN | 207174704 | U | 4/2018 |
| CN | 108820816 | A | 11/2018 |
| CN | 109095086 | * | 12/2018 |
| CN | 104229396 | * | 2/2019 |
| CN | 110406907 | A | 11/2019 |
| CN | 209635286 | U | 11/2019 |
| CN | 110921219 | * | 3/2020 |
| CN | 112027518 | A | 12/2020 |
| JP | 2014213995 | A | 11/2014 |
| JP | 6072598 | B2 | 2/2017 |
| SU | 1472384 | * | 4/1989 |
| WO | 2020220844 | A1 | 11/2020 |

OTHER PUBLICATIONS

The 1st Office Action dated Jul. 1, 2022 of Chinese Application No. 202110012667.3.
Extended European Search Report dated Feb. 21, 2025 of European Application No. 22736546.7.

* cited by examiner

APPARATUS FOR SORTING AND CONVEYING

CROSS REFERENCE

The present disclosure is National Stage of International Application No. PCT/CN2022/070375, filed on Jan. 5, 2022, and claims priority to Chinese Patent Application No. 202110012667.3, filed on Jan. 6, 2021, and both the entire contents of which are incorporated herein by reference.

TECHNICAL FIELD

The present disclosure generally relates to the technical field of logistics, and in particular, to an apparatus for sorting and conveying.

BACKGROUND

Straight cross-belt sorter is a device for use in the field of logistics, which is used for the transportation and sorting of items. In the related art, the rollers of the sorting trolley of the straight cross-belt sorter often have a suspended state during turning.

SUMMARY

According to some embodiments of the present disclosure, there is provided an apparatus for sorting and conveying, including a cargo carrying assembly, a conveying assembly and a bearing assembly; the conveying assembly is configured to drive the cargo carrying assembly to move; the conveying assembly includes a sprocket set and a chain drivingly connected to the sprocket set, the chain is pivotally connected with a roller, and the sprocket set is configured to be engaged with the roller to drive the cargo carrying assembly to move circularly; and the bearing assembly is disposed adjacent to the sprocket set and configured to bear the roller in response to the roller to be engaged with or disengaged from the sprocket set.

In some embodiments of the present disclosure, the bearing assembly includes:
  a first bearing member, disposed adjacent to an upper portion of a driving sprocket in the sprocket set and configured to bear the roller in response to the roller to be engaged with the driving sprocket; and
  a second bearing member, disposed adjacent to a lower portion of the driving sprocket and configured to bear the roller in response to the roller to be disengaged from the driving sprocket.

In some embodiments of the present disclosure, the first bearing member is in a plate shape and is provided with a first notch, and the first notch is configured to accommodate a part of sprocket teeth of the driving sprocket; and
  in response to the roller being engaged and not completely engaged with the driving sprocket, the driving sprocket is engaged with a part of the roller, and the first bearing member bears another part of the roller.

In some embodiments of the present disclosure, the first bearing member includes a first rectangular plate and a second rectangular plate, a length of the first rectangular plate is smaller than a length of the second rectangular plate, and an end of the first rectangular plate is aligned with an end of the second rectangular plate; and
  a region where another end of the first rectangular plate and another end of the second rectangular plate are staggered forms the first notch;
  where, in response to the roller being not engaged with the driving sprocket, the first rectangular plate and the second rectangular plate jointly bear the roller; and in response to the roller being engaged and not completely engaged with the driving sprocket, the second rectangular plate bears the roller.

In some embodiments of the present disclosure, the second bearing member includes a straight segment and an arc segment, the straight segment is disposed below the driving sprocket, and the arc segment is disposed below a side of the driving sprocket.

In some embodiments of the present disclosure, it further includes:
  a tensioning assembly, disposed adjacent to a driven sprocket of the sprocket set and configured to tension the chain.

In some embodiments of the present disclosure, the tensioning assembly includes:
  a tensioning screw, where an end of the tensioning screw is connected to the driven sprocket;
  an adjusting nut, screwed to another end of the tensioning screw; and
  an elastic element, connected to the adjusting nut and configured to enable the driven sprocket to have a tendency of being away from the driving sprocket of the sprocket set.

In some embodiments of the present disclosure, the bearing assembly further includes:
  a first fixed bearing member, connected to a rack of the apparatus for sorting and conveying and disposed adjacent to a lower portion of the driven sprocket;
  a first movable bearing member, connected to the driven sprocket and disposed adjacent to the lower portion of the driven sprocket; where, the first movable bearing member is slidably connected to the first fixed bearing member and is configured to be able to move relative to the first fixed bearing member in response to the driven sprocket being away from the driving sprocket of the sprocket set.

In some embodiments of the present disclosure, the first fixed bearing member is provided with a first groove, and at least part of the first movable bearing member is slidably accommodated in the first groove; and
  a bearing surface of the first fixed bearing member is flush with a bearing surface of the first movable bearing member.

In some embodiments of the present disclosure, the bearing assembly further includes:
  a second fixed bearing member, connected to a rack of the apparatus for sorting and conveying and disposed adjacent to an upper portion of the driven sprocket; and
  a second movable bearing member, connected to the driven sprocket and disposed adjacent to the upper portion of the driven sprocket; where, the second movable bearing member is slidably connected to the second fixed bearing member and is configured to be able to move relative to the second fixed bearing member in response to the driven sprocket being away from the driving sprocket of the sprocket set.

In some embodiments of the present disclosure, the second fixed bearing member is provided with a second groove, and at least part of the second movable bearing member is slidably accommodated in the second groove; and
  a bearing surface of the second fixed bearing member is flush with a bearing surface of the second movable bearing member.

In some embodiments of the present disclosure, the second fixed bearing member and the second movable bearing member form a second notch, and the second notch is configured to accommodate a part of sprocket teeth of the driven sprocket.

In some embodiments of the present disclosure, the apparatus further includes:
- a guide assembly, configured to guide the roller to engage with the sprocket set.

In some embodiments of the present disclosure, the guide assembly includes:
- a first guide member, disposed adjacent to the driving sprocket of the sprocket set and configured to guide the roller to engage with the driving sprocket; and
- a second guide member, disposed adjacent to the driven sprocket of the sprocket set and configured to guide the roller to engage with the driven sprocket.

In some embodiments of the present disclosure, the roller is pivoted together with two adjacent links of the chain.

In some embodiments of the present disclosure, the driving sprocket is disposed at an end of the apparatus for sorting and conveying, and a driven sprocket in the sprocket set is disposed at another end of the apparatus for sorting and conveying.

In some embodiments of the present disclosure, another end of the second rectangular plate extends substantially to a center line of the driving sprocket.

In some embodiments of the present disclosure, the center line is perpendicular to the second rectangular plate.

In some embodiments of the present disclosure, a blocking piece is provided between an end of the elastic element and the adjusting nut.

BRIEF DESCRIPTION OF THE DRAWINGS

The above-mentioned and other features and advantages of the present disclosure will become more apparent from the detailed description of the embodiments with reference to the accompanying drawings.

Figure 1:
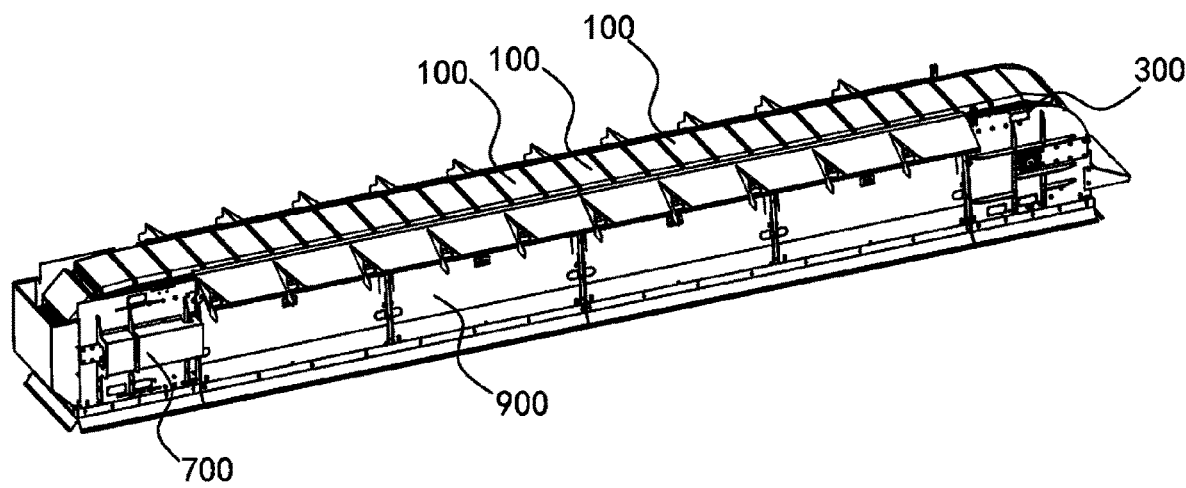
FIG. 1 is a schematic structural diagram of an apparatus for sorting and conveying according to some embodiments of the present disclosure.

Among them, the reference numerals are described as follows.

100 Cargo carrying assembly
110 Roller
120 Cargo caning belt
130 Pallet
140 Frame
150 Driving cylinder
160 Tensioning cylinder
200 Guide assembly
210 First guide member
220 Second guide member
300 Conveying assembly
310 Sprocket set
311 Driving sprocket
312 Driven sprocket
320 Chain
500 Bearing assembly
510 First bearing member
511 First notch
512 First rectangular plate
513 Second rectangular plate
520 Second bearing member
521 Straight segment
522 Arc segment
530 First fixed bearing member
540 First movable bearing member
700 Tensioning assembly
710 Tensioning screw
720 Adjusting nut
730 Elastic element
740 Blocking piece
900 Rack

DETAILED DESCRIPTION

Example embodiments will now be described more fully with reference to the accompanying drawings. Example embodiments can, however, be embodied in many forms and should not be construed as limited to the embodiments set forth here; rather, these embodiments are provided so that the present disclosure will be thorough and complete, and will fully convey the concept of example embodiments to those skilled in the art. The same reference numbers in the figures denote the same or similar structures, and thus detailed description thereof will be omitted.

In the field of logistics sorting and conveying, conveying and sorting of items are usually achieved by using an apparatus for sorting and conveying. The item action is divided into two categories: conveying motion and sorting motion. The so-called conveying motion refers to conveying the item from one position to the set position using the conveying assembly 300. The sorting motion refers to moving the item out of the conveying assembly 300, so that the item is separated from the conveying assembly 300. More specifically, the sorting is also a process of separating the item from the cargo carrying assembly 100.

It is worth mentioning that when the cargo carrying assembly of the apparatus for sorting and conveying in the related art turns, the chain can be bent by the weight of the item and the dead weight of the cargo carrying assembly due to the item placed on the cargo carrying assembly. When the roller on the bent chain is to be engaged with the sprocket set or disengaged from the engaging state, in this process, as the roller is not completely engaged with the sprocket, the roller is in a suspended state, the roller has no bearing resulting that stability of the roller is poor, the situation of impacting the sprocket set or the rack occurs, noise and vibration are large, and the device on the cargo carrying assembly is prone to damage.

Based on this, the embodiments of the present disclosure provide an apparatus for sorting and conveying. By designing a bearing assembly near the sprocket set, when the roller the roller is to be engaged with or disengaged from the sprocket set, the bearing assembly can bear the roller at any time, so that the roller is prevented from being in a suspended state, the stability of the roller is improved, and the problems that noise and vibration are large, and devices on the cargo carrying assembly are prone to damage in the related art are solved.

Figure 2:
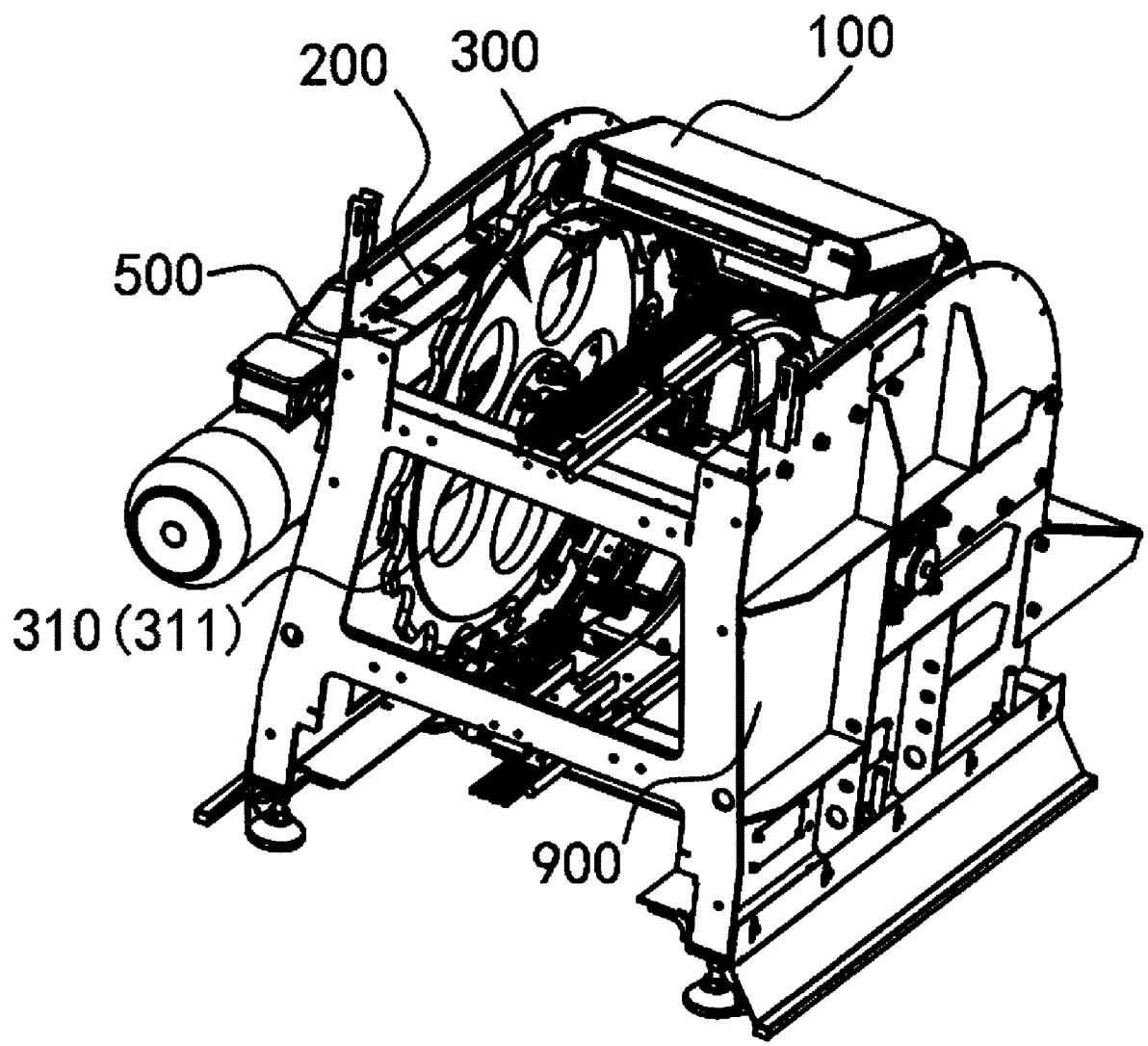
FIG. 2 is a local schematic structural diagram of a side of an apparatus for sorting and conveying provided with a driving sprocket according to some embodiments of the present disclosure.

As shown in FIG. 1 and FIG. 2, FIG. 1 shows a schematic structural diagram of an apparatus for sorting and conveying according to some embodiments of the present disclosure, and FIG. 2 shows a local schematic structural diagram of a side of an apparatus for sorting and conveying provided with a driving sprocket according to some embodiments of the present disclosure. The apparatus for sorting and conveying of the embodiments of the present disclosure includes a cargo carrying assembly 100, a guide assembly 200, a conveying assembly 300, a bearing assembly 500, a tensioning assembly 700, and a rack 900.

The conveying assembly 300 is configured to drive the cargo carrying assembly 100 to move, such as to move circularly, so as to convey items placed on the cargo carrying assembly 100 to a set position. In one embodiment, the conveying assembly 300 may include a sprocket set 310 and a chain 320 drivingly connected to the sprocket set 310, and the chain 320 is pivotally connected with a roller 110.

The cargo carrying assembly 100 is configured to move the items placed on it out of the cargo carrying assembly 100, so as to achieve sorting. In one embodiment, the roller 110 is pivoted together with two adjacent links of the chain 320, and the cargo carrying assembly 100 can smoothly move along with the conveying assembly 300 by means of the roller 100.

The bearing assembly 500 is disposed on the rack 900 and adjacent to the sprocket set 310, and is configured to bear the roller 110 when the roller 110 is to be engaged with or disengaged from the sprocket set 210. The guide assembly 200 is configured to guide the roller 110 to engage with the sprocket set 310. The tensioning assembly 700 is disposed adjacent to the driven sprocket 312 of the sprocket set 310 and is configured to tension the chain 320.

Figure 3:
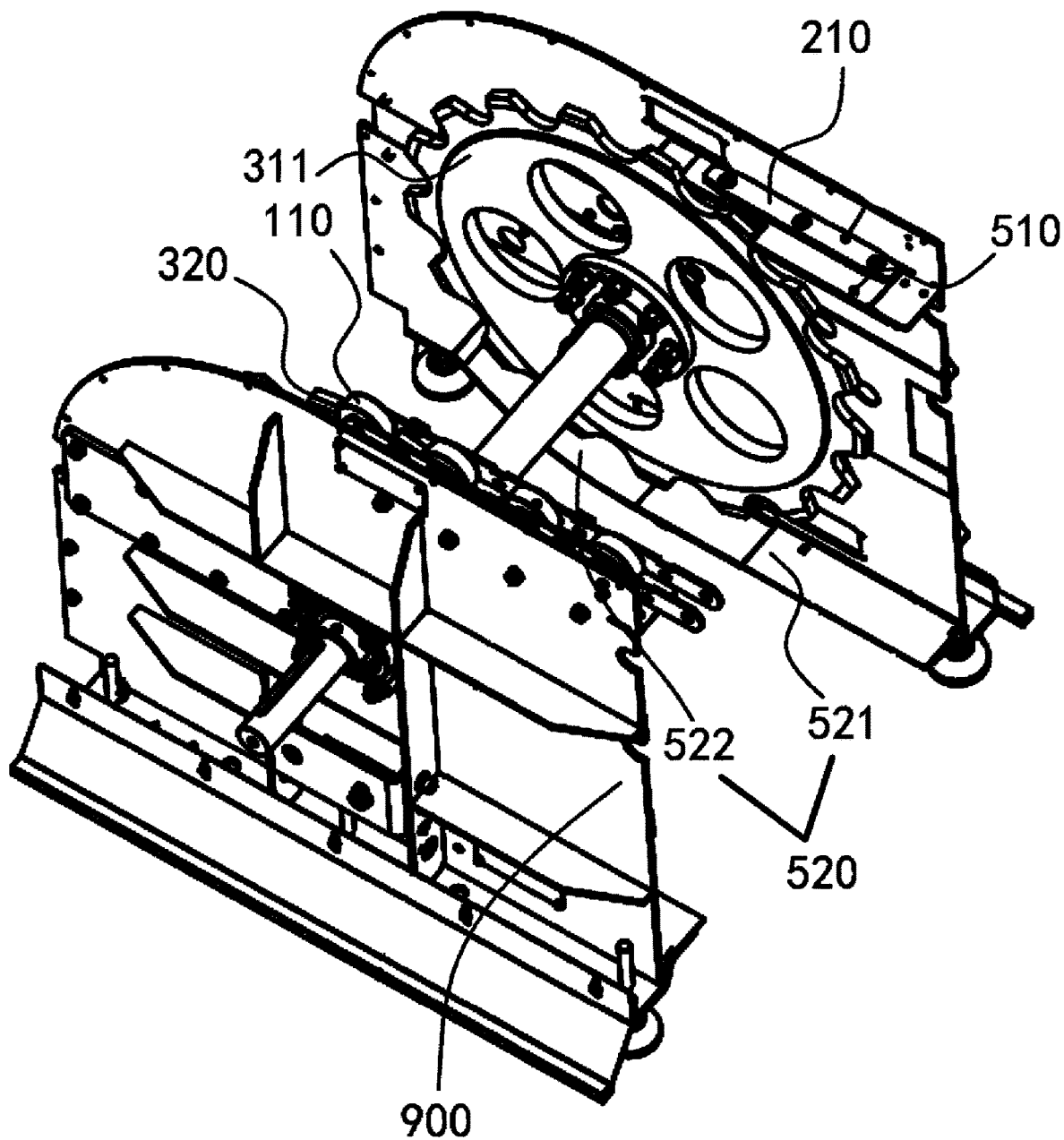
FIG. 3 is a local schematic structural diagram from a viewing angle of a side of an apparatus for sorting and conveying provided with a driving sprocket according to some embodiments of the present disclosure, in which a part of the cargo carrying assembly is removed.
Figure 4:
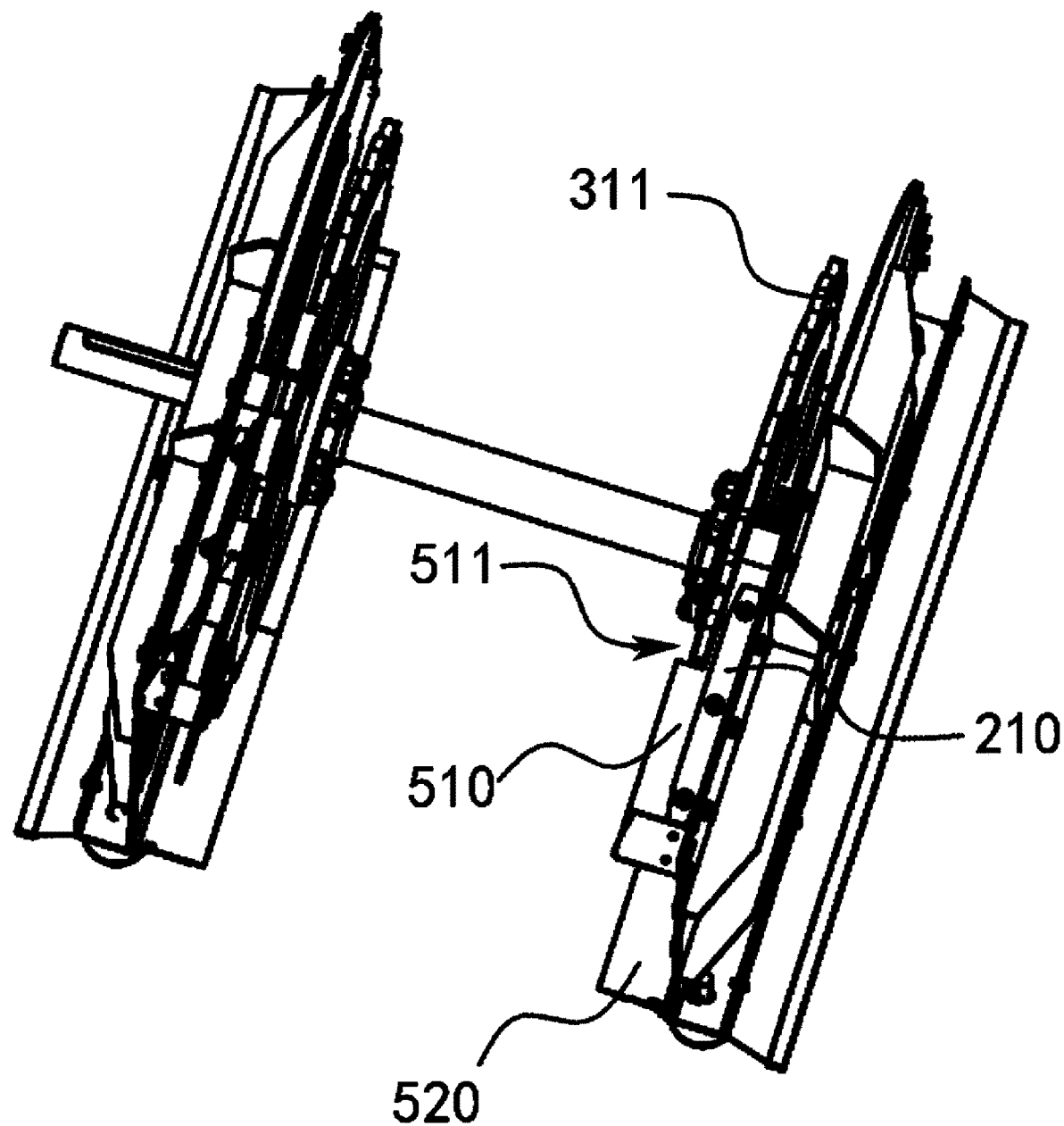
FIG. 4 is a local schematic structural diagram from another viewing angle of a side of an apparatus for sorting and conveying provided with a driving sprocket according to some embodiments of the present disclosure, in which a part of the cargo carrying assembly is removed.
Figure 7:
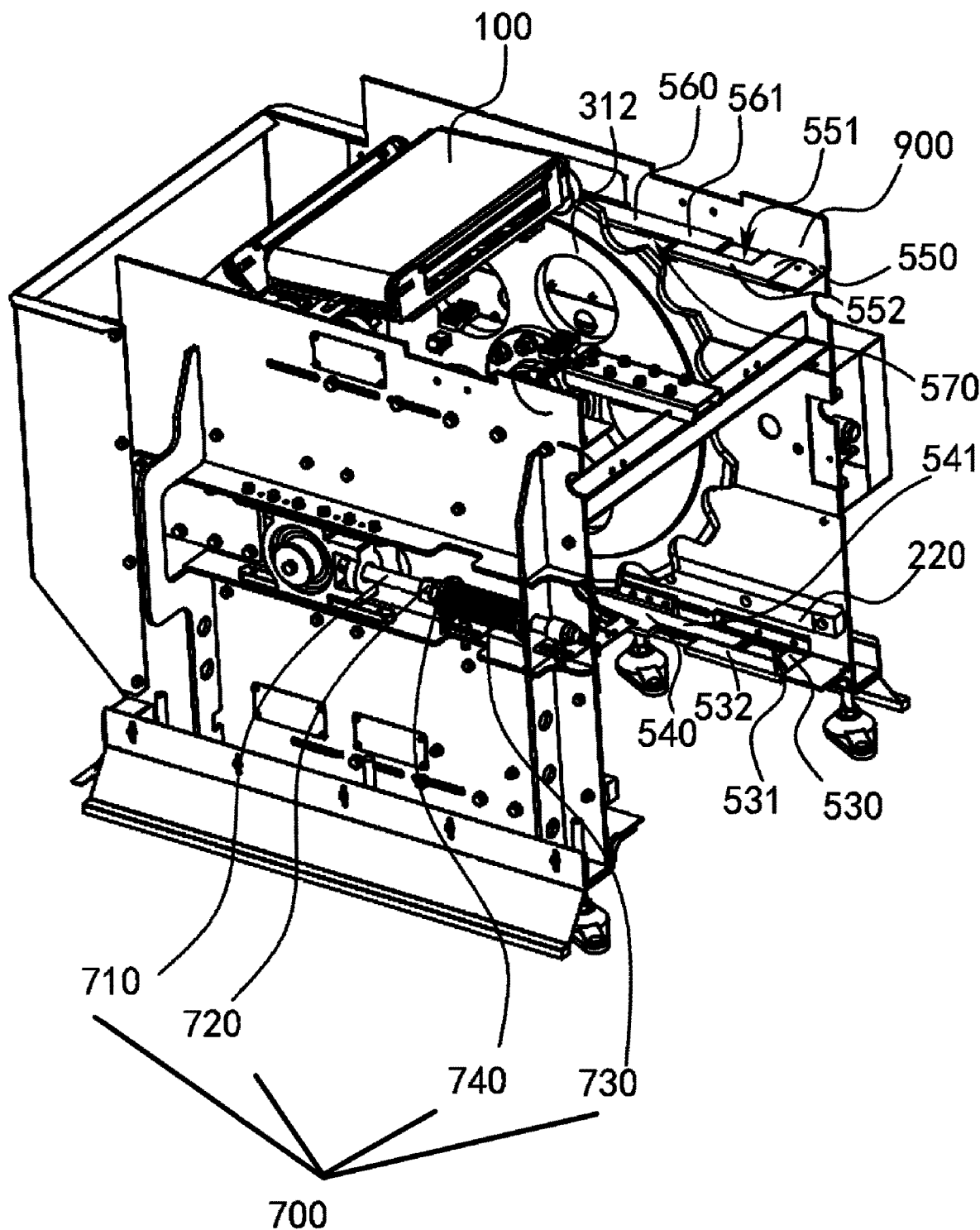
FIG. 7 is a local schematic structural diagram of a side of an apparatus for sorting and conveying provided with a driven sprocket according to some embodiments of the present disclosure.

As shown in FIG. 3 and FIG. 4, FIG. 3 shows a local schematic structural diagram from a viewing angle of a side of an apparatus for sorting and conveying provided with a driving sprocket according to some embodiments of the present disclosure, in which a part of the cargo carrying assembly is removed. FIG. 4 shows a local schematic structural diagram from another viewing angle of a side of an apparatus for sorting and conveying provided with a driving sprocket according to some embodiments of the present disclosure, in which a part of the cargo carrying assembly is removed. The conveying assembly 300 of the embodiments of the present disclosure includes a sprocket set 310 and a chain 320 drivingly connected to the sprocket 310. The sprocket set 310 is provided with two set, one set includes two driving sprockets 311, and the other set includes two driven sprockets 312 (as shown in FIG. 7). The two driving sprockets 311 are disposed at one end of the apparatus for sorting and conveying, and the two driven sprockets 312 are disposed at the other end of the apparatus for sorting and conveying.

The number of the chains 320 may also be two, one of the chains 320 is wound around one of the driving sprockets 311 and one of the driven sprockets 312 respectively, the other chain 320 is wound on the other driving sprocket 311 and the other driven sprocket 312 respectively. The driving sprockets 311 may be driven by an external force to rotate, and the driven sprocket 312 moves with it by the chain 320.

Of course, the number of the chain 320 and the sprocket set 310 cooperating with the chain may also be one or more. Considering the stability and cost of conveying, the embodiments of the present disclosure adopts two chains 320 and two sets of driving sprockets 311 and driven sprockets 312 drivingly connected to the chains 320 respectively.

With continued reference to FIG. 3 and FIG. 4, the bearing assembly 500 according to some embodiments of the present disclosure includes a first bearing member 510 and a second bearing member 520, the first bearing member 510 is fixedly connected to the rack 900, and is disposed adjacent to an upper portion of the driving sprocket 311 in the sprocket set 310, and is configured to bear the roller 110 when the roller 110 is to be engaged with the driving sprocket 311.

As shown in FIG. 3, in order to clearly express the first bearing member 510, in FIG. 3, one of the two chains 320 is omitted, and the other chain 320 is shown. When the chain 320 of the conveying assembly 300 moves, the roller 110 on the chain 320 is engaged with the driving sprocket 311 one by one, and finally the motion of the cargo carrying assembly 100 is achieved. The first bearing member 510 can bear the rollers 110 not engaged with the sprocket teeth of the driving sprocket 311 or not completely engaged with the sprocket teeth of the driving sprocket 311, so that the roller 100 is always in an unsuspended state before the roller 100 is completely engaged with the sprocket teeth of the driving sprocket 311, which makes the roller 110 more stable, and the situation of impacting the sprocket or the frame due to the suspension of the roller in the related art is avoided.

Then, the roller 110 is completely engaged with the sprocket teeth of the driving sprocket 311, so that the roller 110 is ensured to be not suspended under the condition that the first bearing member 510 does not bear by the roller 110.

The second bearing member 520 is fixedly connected to the rack 900 and disposed adjacent to a lower portion of the driving sprocket 311, and is configured to bear the roller 110 when the roller 110 is to be disengaged from the driving sprocket 311.

Similarly, in order to clearly express the second bearing member 520, in FIG. 3, one chain 320 is shown, and the other chain 320 is omitted. When the roller 110 is to be disengaged from the sprocket teeth of the driving sprocket 311, the roller 110 gradually disengages from the sprocket teeth of the driving sprocket 311, and at this time, the roller 110 is in a suspended state. In order to prevent the roller 110 from impacting the sprocket or the frame due to suspension, t the second bearing member 520 is used to bear the roller 110 to be disengaged from the sprocket teeth of the driving sprocket 311 in the embodiment of the present disclosure. Although the roller 110 is to be disengaged from the sprocket teeth or has been disengaged from the sprocket teeth, the stability of the roller 110 can still be ensured through the design of the second bearing member 520.

Figure 5:
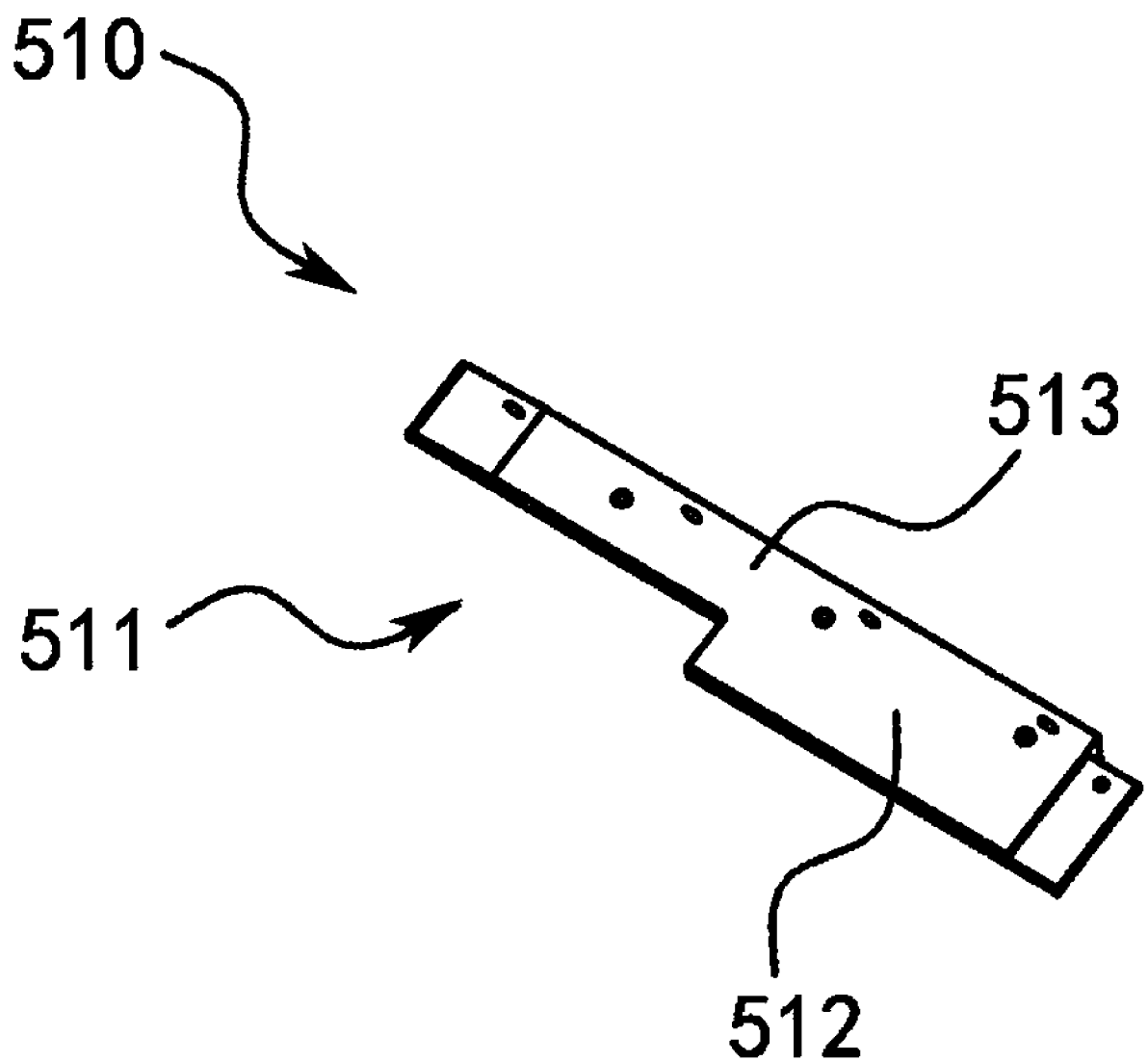
FIG. 5 is a schematic structural diagram of a first bearing member according to some embodiments of the present disclosure.

As shown in FIG. 5, FIG. 5 is a schematic structural diagram of a first bearing member according to some embodiments of the present disclosure. The first bearing member 510 in the embodiments of the present disclosure may be in a plate shape and is provided with a first notch 511, and the first notch 511 is configured to accommodate a part of the sprocket teeth of the driving sprocket 311 (as shown in FIG. 4).

When the roller 110 is engaged with the sprocket teeth of the driving sprocket 311 and is not completely engaged, the driving sprocket 311 is engaged with a part of the roller 110, and the first bearing member 510 bears another part of the roller 110. That is, when the roller 110 is not completely engaged with the driving sprocket 311, the roller 110 is divided into two parts along the axial direction, in which the driving sprocket 311 bears one part, and the first bearing member 510 bears the other part. In this way, before the roller 110 is completely engaged with the driving sprocket 311, it is to bear the roller 110 integrally, thus ensuring the stability of the roller 110.

With continued reference to FIG. 5, the first bearing member 510 of the embodiment of the present disclosure includes a first rectangular plate 512 and a second rectangular plate 513, the length of the first rectangular plate 512 is less than the length of the second rectangular plate 513, an end of the first rectangular plate 512 is aligned with an end of the second rectangular plate 513, another end of the first rectangular plate 512 and another end of the second rectangular plate 513 are staggered, and the staggered region forms the first notch 511.

When the roller 110 is not engaged with the driving sprocket 311, the first rectangular plate 512 and the second rectangular plate 513 jointly bear the roller 110, and when the roller 110 is engaged and not completely engaged with the driving sprocket 311, the second rectangular plate 513 bears the roller 110.

It is worth mentioning that "engaged and not completely engaged" in the present disclosure refers to an engagement state that the roller 110 is engaged with a part of the sprocket teeth of the sprocket, but there is still a clearance between the periphery of the roller 110 and the sprocket teeth.

It is worth mentioning that the "unengaged" in the present disclosure refers to that the roller 110 is not engaged with the sprocket teeth of the sprocket.

It is worth mentioning that the "completely engaged" in the present disclosure refers to an engagement state that the periphery of the roller 110 is in complete contact with the sprocket teeth of the sprocket and there is no clearance.

As shown in FIG. 3, another end of the second rectangular plate 513 extends substantially to the center line of the driving sprocket 311, and the centerline is defined as: one of the lines passing through the diameter of the driving sprocket 311, and the line is perpendicular to the second rectangular plate 513.

By designing another end of the second rectangular plate 513 to substantially extend to the center line of the driving sprocket 311, the first bearing member 510 can bear both of the roller 110 and the driving sprocket 311 before the roller 110 and the driving sprocket 311 are not completely engaged with each other, thus ensuring the stability of the roller 110.

Figure 6:
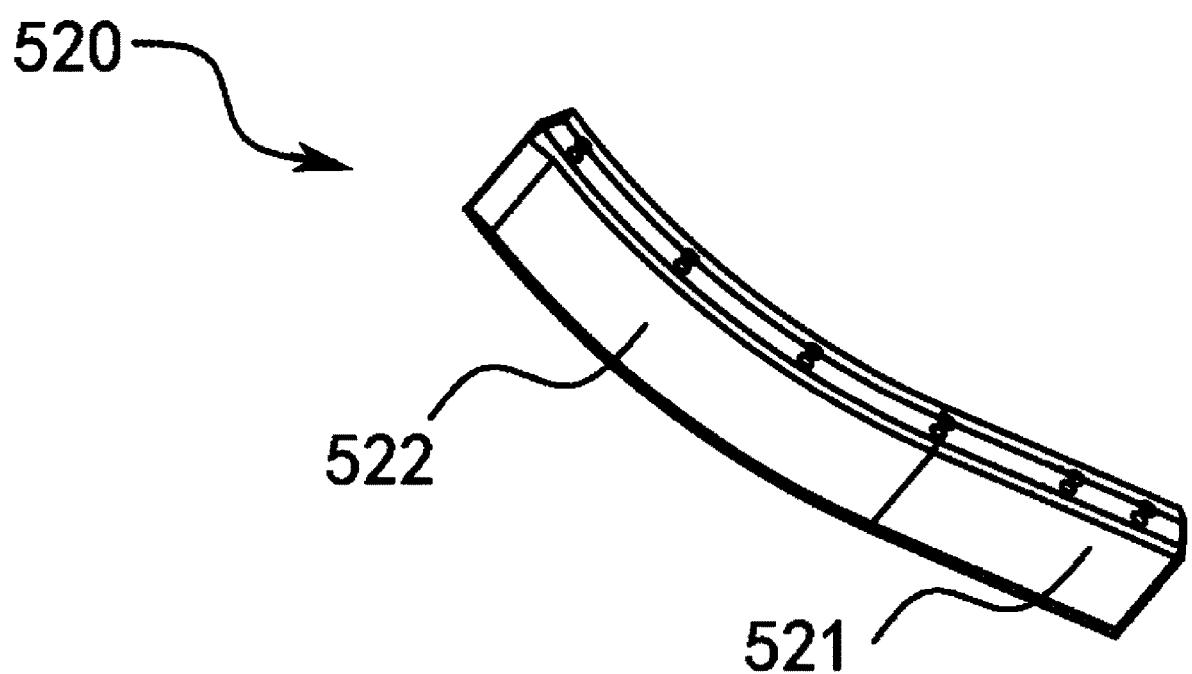
FIG. 6 is a schematic structural diagram of a second bearing member according to some embodiments of the present disclosure.

As shown in FIG. 6, FIG. 6 shows a schematic structural diagram of a second bearing member according to some embodiments of the present disclosure. The second bearing member 520 of the embodiment of the present disclosure includes a straight segment 521 and an arc section 522, the straight segment 521 is configured to be disposed below the driving sprocket 311, and the arc segment 522 is configured to be disposed below a side of the driving sprocket 311.

As shown in FIG. 3 and FIG. 6, the roller 110 gradually moves from the upper to the lower along with the rotation of the driving sprocket 311, and in the process that the roller 110 moves downwards and is to be disengaged from the driving sprocket 311, when the roller 110 is not completely disengaged from the driving sprocket 311, the arc segment 522 bears the roller 110; and when the roller 110 is completely disengaged from the driving sprocket 311, the straight segment 521 bears the roller 110.

Figure 8:
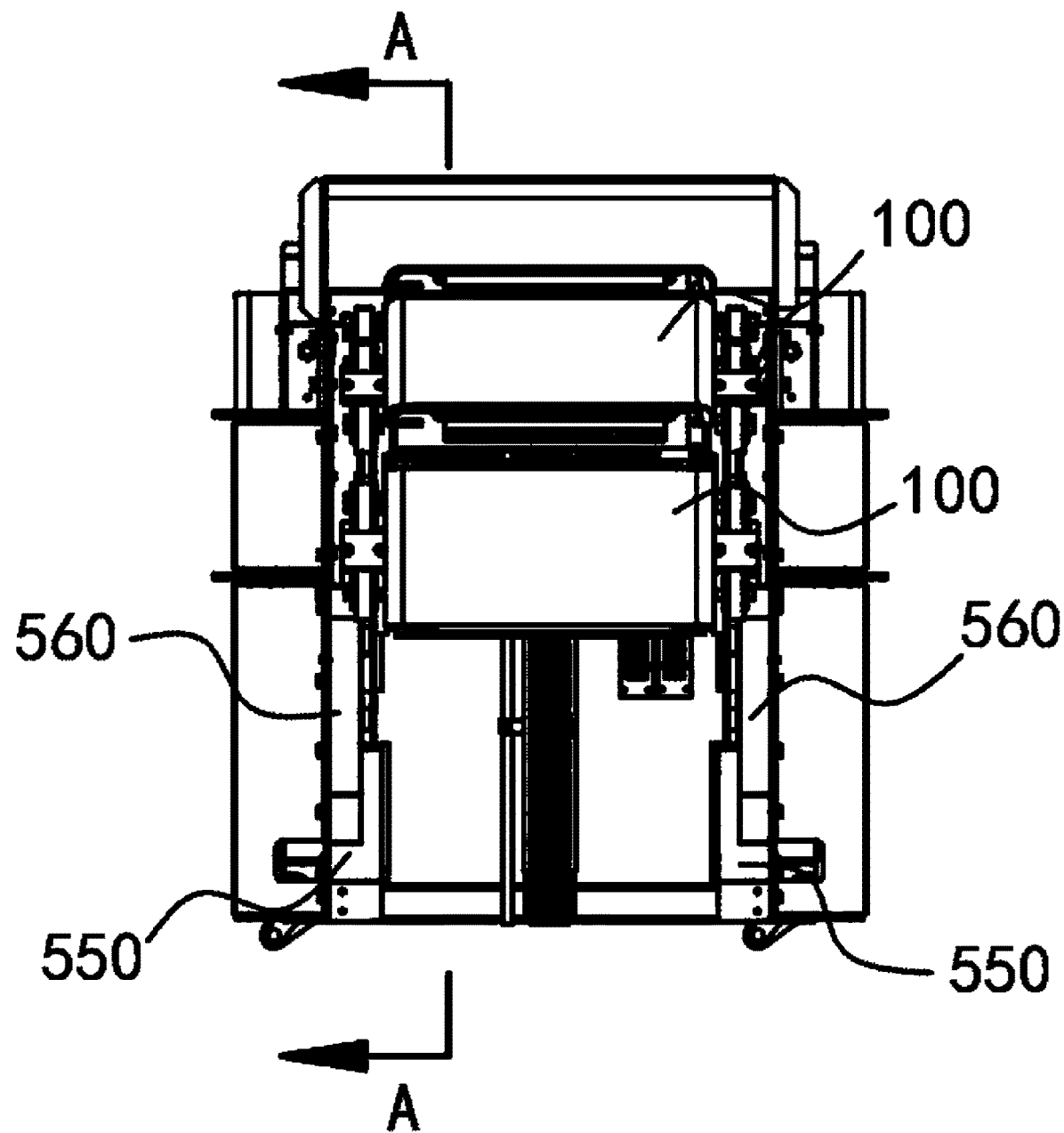
FIG. 8 shows a top view of a side of an apparatus for sorting and conveying provided with a driven sprocket according to some embodiments of the present disclosure.
Figure 9:
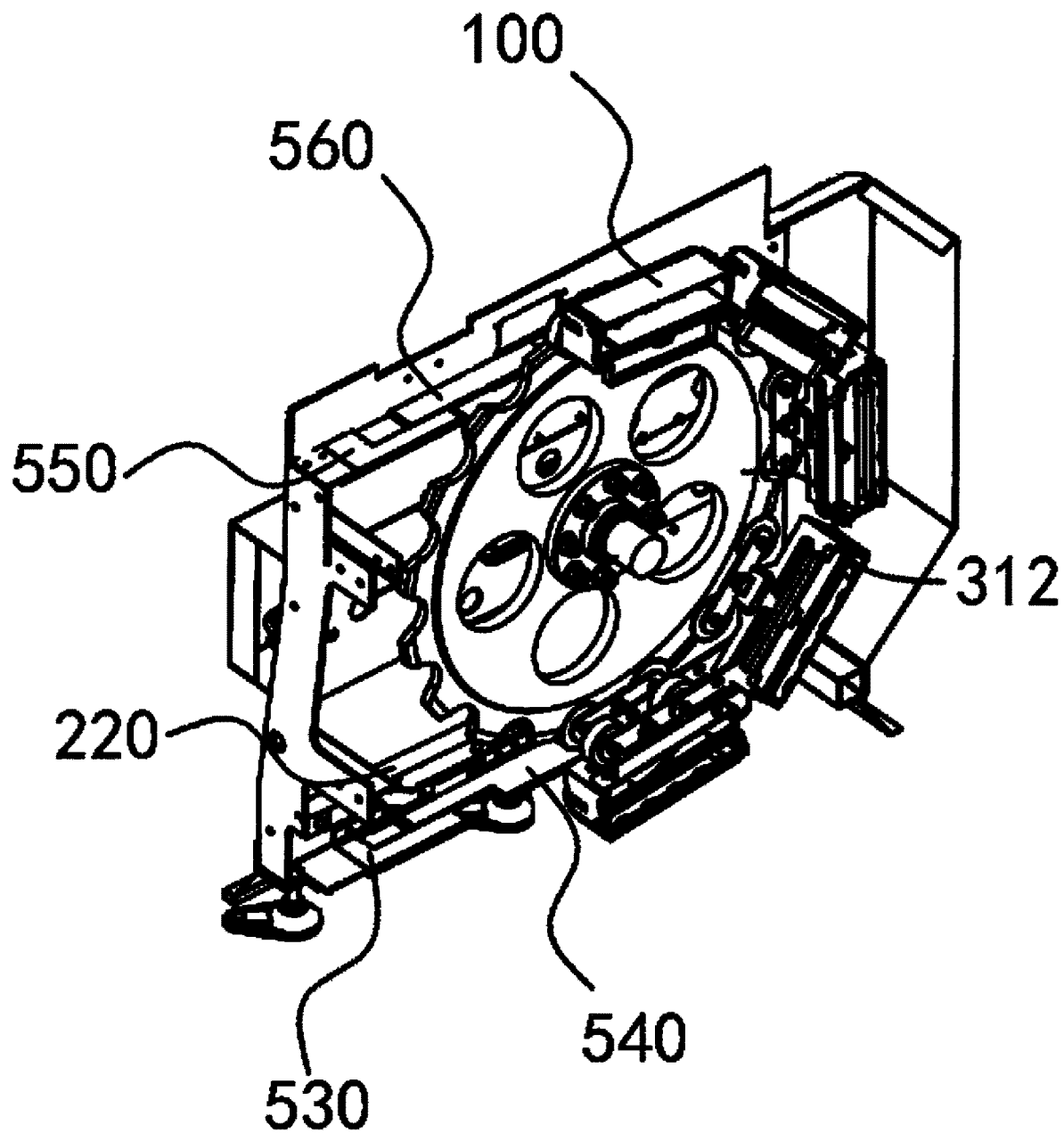
FIG. 9 is a cross-sectional view taken along section line A-A of FIG. 8.

As shown in FIG. 7, FIG. 7 shows a local schematic structural diagram of a side of the apparatus for sorting and conveying provided with a driven sprocket according to some embodiments of the present disclosure. FIG. 8 shows a top view of the side of the apparatus for sorting and conveying provided with a driven sprocket according to some embodiments of the present disclosure. FIG. 9 shows a cross-sectional view along section line A-A of FIG. 8. The apparatus for sorting and conveying of the embodiments of the present disclosure further includes a tensioning assembly 700, and the tensioning assembly 700 is disposed adjacent to the driven sprocket 312 of the sprocket set 310 and is configured to tension the chain 320. The tensioning assembly 700 enables the driven sprocket 312 to move toward a direction away from the driving sprocket 311 by pushing against the driven sprocket 312, so as to achieve the tension of the chain 320.

As shown in FIG. 7, the tensioning assembly 700 of the embodiment of the present disclosure includes a tensioning screw 710, an adjusting nut 720, an elastic element 730 and a blocking piece 740, where an end of the tensioning screw 710 is screwed to a bearing seat, and the driven sprocket 312 is connected to the bearing seat, for example, through a transmission shaft. Another end of the tensioning screw 710 is screwed to the adjusting nut 720, and the adjusting nut 720 can move in a direction close to or away from the bearing seat along the tensioning screw 710 by rotating the adjusting nut 720.

An end of the elastic element 730 is connected to the rack 900, another end of the elastic element 730 is connected to the adjusting nut 720, and is configured to enable the driven sprocket 312 to have a tendency of being away from the driving sprocket 311 of the sprocket set 310. The elastic element 730 may be a compression spring.

A blocking piece 740 is provided between the another end of the elastic element 730 and the adjusting nut 720 to ensure that the elastic force of the elastic element 730 stably acts on the adjusting nut 720.

The elastic force of the elastic element 730 can be adjusted by rotating the adjusting nut 720, so as to adjust the tension force of the tensioning chain 320.

With continued reference to FIG. 7, the bearing assembly 500 according to some embodiments of the present disclosure further includes a first fixed bearing member 530 and a first movable bearing member 540, and the first fixed bearing member 530 is connected to a rack 900 of the apparatus for sorting and conveying and is disposed adjacent to a lower portion of the driven sprocket 312. The first movable bearing member 540 is connected to the driven sprocket 312 and is disposed adjacent to the lower portion of the driven sprocket 312. When the tensioning assembly 700 is in operation, the first movable bearing member 540 can move together with the driven sprocket 312.

The first movable bearing member 540 is slidably connected to the first fixed bearing member 530 and is configured to be able to move relative to the first fixed bearing member 530 when the driven sprocket 312 is away from the drive sprocket 311 of the sprocket set 310.

Since the tensioning assembly 700 is provided at the driven sprocket 312, when the chain 320 needs to be tensioned, in order to enable the bearing assembly 500 at the position to continuously bear the roller 110, the first fixed bearing member 530 and the first movable bearing member 540 are designed to be slidably connected, so that although the driven sprocket 312 needs to be moved for tensioning the chain 320, the first fixed bearing member 530 and the first movable bearing member 540 can still play the role of bearing the roller 110.

With continued reference to FIG. 7, the first fixed bearing member 530 is provided with a first groove 531, and at least part of the first movable bearing member 540 is slidably accommodated in the first groove 531. A bearing surface 532 of the first fixed bearing member 530 is flush with a bearing surface 541 of the first movable bearing member 540.

At the driven sprocket 312, the roller 110 is first engaged with the driven sprocket 312 from below. As the driven sprocket 312 rotates, the roller 110 moves to above.

The bearing assembly 500 further includes a second fixed bearing member 550 and a second movable bear 560, and the second fixed bearing member 550 is connected to a rack 900 of the apparatus for sorting and conveying and is disposed adjacent to the upper portion of the driven sprocket 312.

The second movable bear 560 is connected to the driven sprocket 312 and is disposed adjacent to the upper portion of the driven sprocket 312. The second movable bear 560 is slidably connected to the second fixed bearing member 550 and is configured to be able to move relative to the second fixed bearing member 550 when the driven sprocket 312 is away from the drive sprocket 311 of the sprocket set 310.

Although the driven sprocket 312 needs to be moved for tensioning the chain 320, the second stationary bear 550 and the second movable bear 560 can still play the role of bearing the roller 110 as the second movable bear 560 is slidably connected to the second stationary bear 550.

The second fixed bearing bracket 550 is provided with a second groove 551, and at least part of the second movable bearing member 560 is slidably accommodated in the second groove 551. A bearing surface 552 of the second fixed bearing bracket 550 is flush with a bearing surface 561 of the second movable bearing member 560.

The second fixed bearing member 550 and the second movable bear 560 form a second notch 570, and the second notch 570 is configured to accommodate a part of the sprocket teeth of the driven sprocket 312 in there.

Through the design of accommodating a part of the sprocket teeth of the driven sprocket 312 in the second notch 570, when the roller 110 is to be disengaged from and not completely disengaged form the driven sprocket 312, the second moving bear 560 bears the roller 110. When the roller 110 is completely disengaged form the driven sprocket 312, the second fixed bearing member 550 and the second moving bear 560 jointly bear the roller 110.

The guide assembly 200 of the embodiments of the present disclosure is configured to guide the roller 110 to engage with the sprocket set 310.

Figure 10:
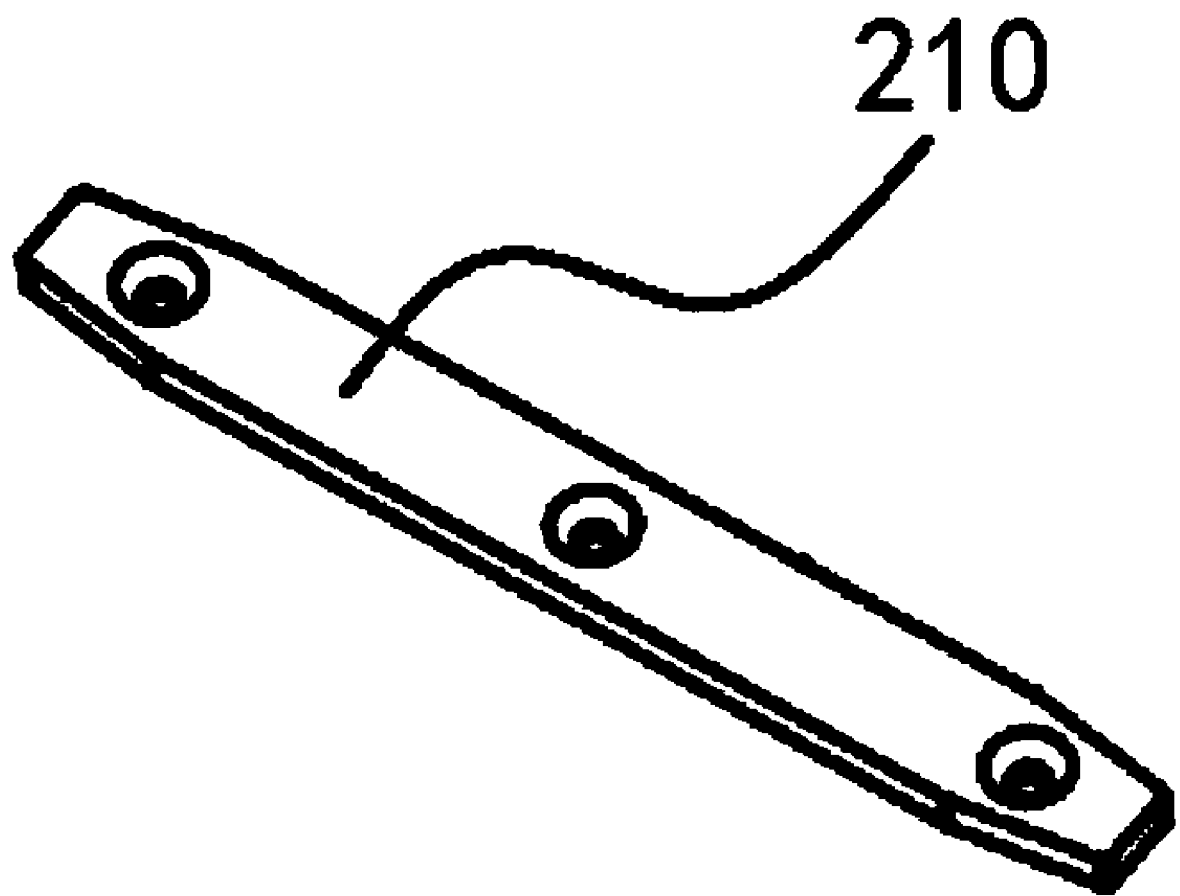
FIG. 10 is a schematic structural diagram of a first guide member according to some embodiments of the present disclosure.

Specifically, as shown in FIG. 3, FIG. 7 and FIG. 10, FIG. 10 shows a schematic structural diagram of a first guide member according to some embodiments of the present disclosure, and the guide assembly 200 includes a first guide member 210 and a second guide member 220.

The first guide 210 is disposed adjacent to the driving sprocket 311 of the sprocket set 310, and is configured to guide the roller 110 to engage with the driving sprocket 311. For example, the first guide 210 may be a strip. The first guide 210 may be mounted on the first bearing member 510. Through the guiding effect of the first guide member 210, the roller 110 can be aligned with the sprocket teeth before being engaged with the sprocket teeth of the driving sprocket 311.

The second guide member 220 is disposed adjacent to the driven sprocket 312 of the sprocket set 310, and is configured to guide the roller 110 to engage with the driven sprocket 312. For example, the second guide member 220 may be a strip.

Figure 11:
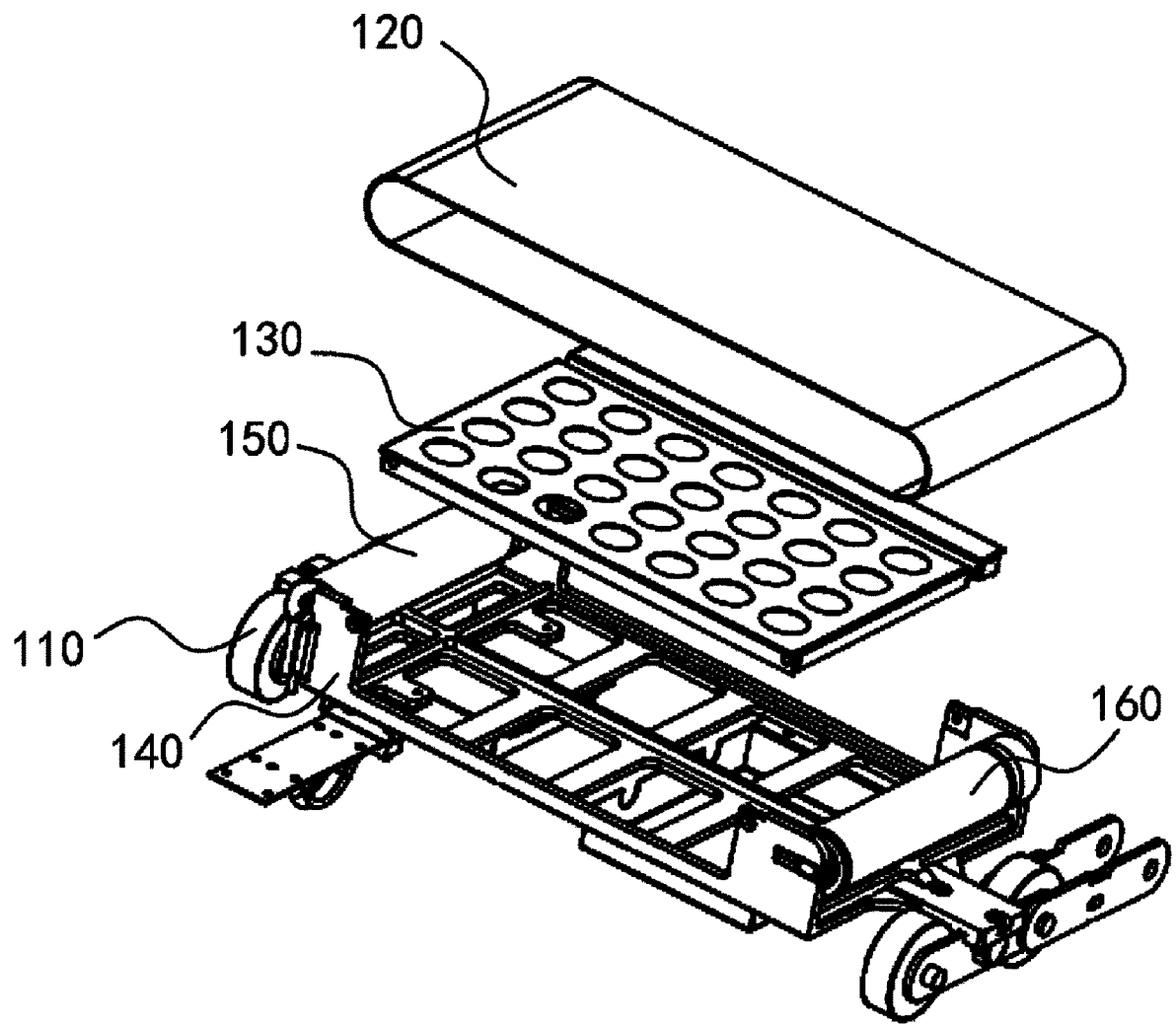
FIG. 11 is an exploded view of a cargo carrying assembly according to some embodiments of the present disclosure.

As shown in FIG. 11, FIG. 11 shows an exploded view of a cargo carrying assembly according to some embodiments of the present disclosure. The cargo carrying assembly 100 according to some embodiments of the present disclosure includes a cargo carrying belt 120, a pallet 130, a frame 140, a driving cylinder 150, and a tensioning cylinder 160.

The cargo carrying belt 120 is wound around the driving cylinder 150 and the tensioning roller 160, and the driving cylinder 150 can drive the cargo carrying belt 120 to move when subjected to an external driving force. The tensioning cylinder 160 is disposed at a side away from the driving cylinder 150 for tensioning the cargo carrying belt 120.

The pallet 130 is mounted on the frame 140 for bearing the cargo carrying belt 120.

Figure 12:
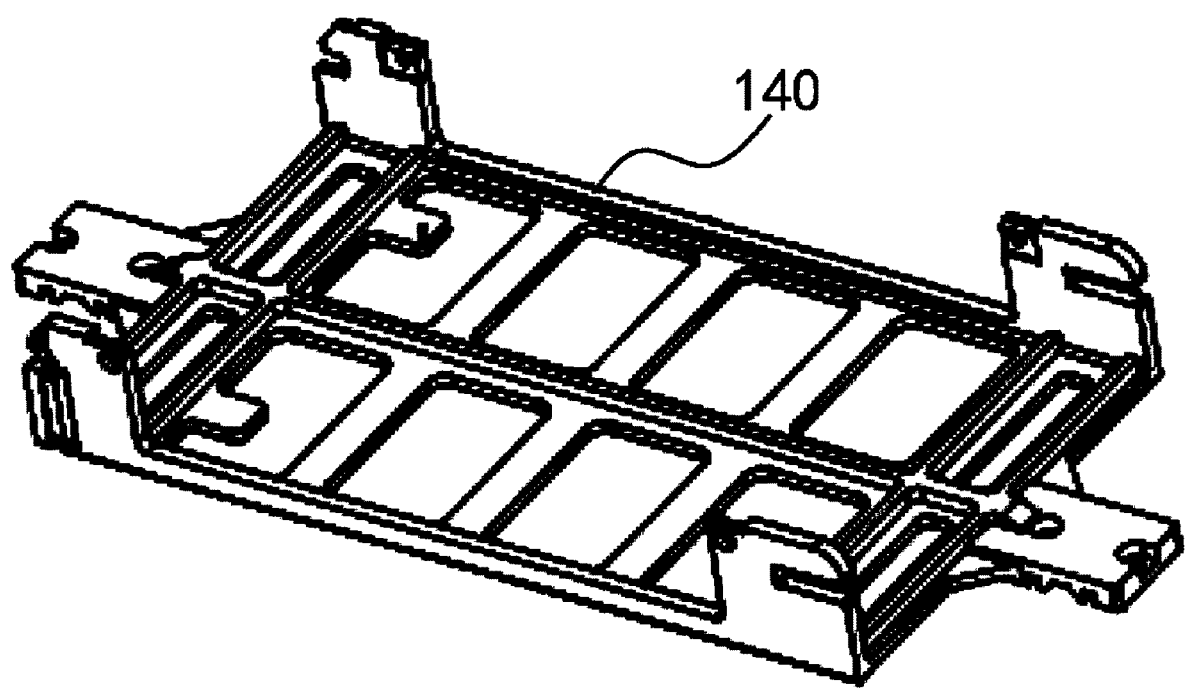
FIG. 12 is a schematic structural diagram of a frame from a viewing angle according to some embodiments of the present disclosure.
Figure 13:
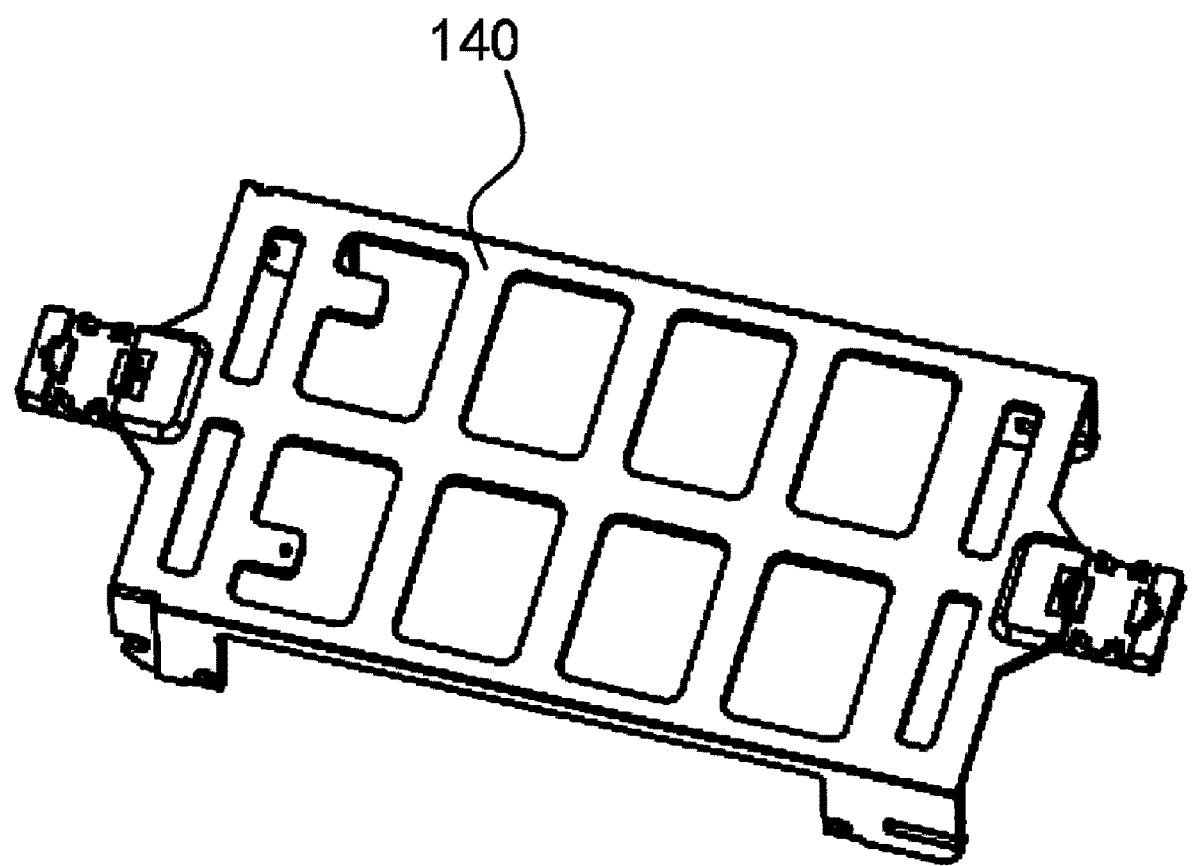
FIG. 13 is a schematic structural diagram of a frame from another viewing angle according to some embodiments of the present disclosure.

As shown in FIG. 12 and FIG. 13, FIG. 12 shows a schematic structural diagram from a viewing angle of a frame according to some embodiments of the present disclosure, and FIG. 13 shows a schematic structural diagram from another viewing angle of a frame according to some embodiments of the present disclosure. The frame of the embodiments of the present disclosure can be cast in one piece, and is compact in structure and free of redundant accessories.

Figure 14:
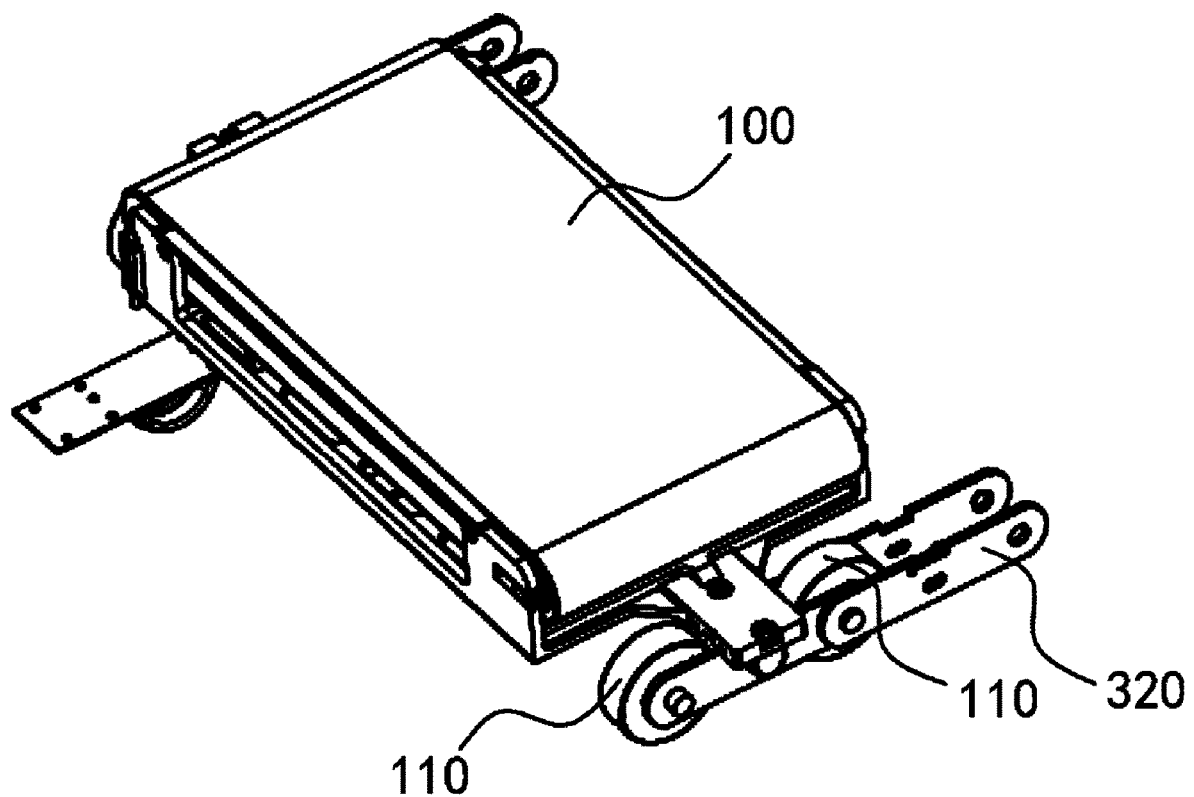
FIG. 14 is a schematic structural diagram of a cargo carrying assembly.

As shown in FIG. 14, FIG. 14 shows a schematic structural diagram of a cargo carrying assembly. The two opposite sides of the cargo carrying assembly 100 of the present embodiment are each provided with two rollers 110. Of course, each side of the cargo carrying assembly 100 can also be provided with one or more rollers 110, and two opposite sides of the frame 140 are respectively connected to the two chains. When the chain 320 is driven by the sprocket, the chain 320 can move together with the cargo carrying assembly 100.

Figure 15:
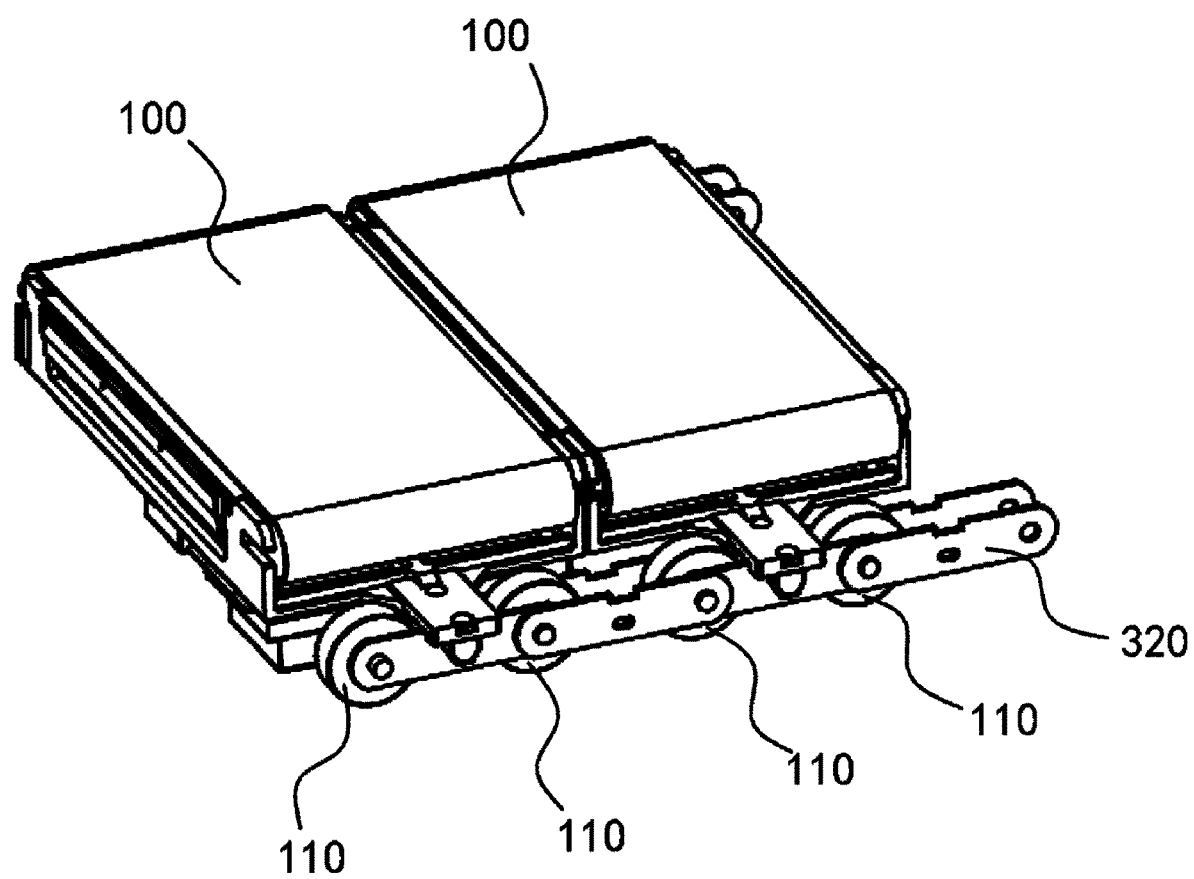
FIG. 15 is a schematic structural diagram of two cargo carrying assemblies connected in series.

As shown in FIG. 15, FIG. 15 shows a schematic structural diagram of two cargo carrying assemblies connected in series. The two cargo loading assemblies 100 are arranged side by side and are respectively connected to the chain 320. Of course, it can be understood that more than one cargo loading assembly 100 may also be arranged in the manner described above. By adopting the design of the roller 110 being pivotally connected to the chain 320 and the frame 140 being connected to the chain 320, the arrangement of more than one cargo assembly 100 is more compact and space-saving.

In summary, the apparatus for sorting and conveying according to the embodiments of the present disclosure has the following advantages and beneficial effects:

According to the apparatus for sorting and conveying provided by the embodiment of the present disclosure, a bearing assembly is designed near the sprocket set, when the roller is to be engaged with or disengaged from the sprocket set, the bearing assembly can bear the roller at any time, avoiding that the roller is in a suspended state, so that the stability of the roller is improved, and the problems in related prior art that noise and vibration are large and devices on the cargo carrying assembly are prone to damage, are solved.

In the embodiments of the present disclosure, the terms "first", "second" and "third" are used for the purpose of description and cannot be understood as indicating or implying relative importance; and the term "more than one" refers to two or more, unless explicitly defined otherwise. Terms such as "mounted", "connected to", "connected with", "fixed" and the like shall be broadly understood, for example, "connected to" may be a fixed connection or a detachable connection, or integrally connected; "connected with" may be directly connected or indirectly connected by means of an intermediate medium. For a person of ordinary skill in the art, the specific meanings of the above terms in the disclosed embodiments may be understood according to specific situations.

In the description of the disclosed embodiments, it should be understood that the orientation or positional relationship indicated by the terms "upper," "lower," "left," "right," "front," "rear," and the like is based on the orientation or positional relationship shown in the drawings, and is intended to facilitate the description of the disclosed embodiments and the simplified description, rather than to indicate or imply that the indicated device or unit must have a particular orientation, or to be constructed and operated in a particular orientation, and therefore cannot be understood as a limitation to the disclosed embodiments.

In the description of the present description, the description of the terms "one embodiment", "some embodiments", "specific embodiments" and the like means that the specific features, structures, materials, or characteristics described in connection with the embodiment or example are included in at least one embodiment or example of the disclosure. In this description, the schematic representation of the above terms does not necessarily refer to the same embodiment or example. Furthermore, the specific features, structures, materials, or characteristics described may be combined in any suitable manner in any one or more embodiments or examples.

The above are the preferred embodiments of the disclosed embodiments, and are not used to limit the disclosed embodiments, and for those skilled in the art, the disclosed embodiments may have various variations and changes. Any modifications, equivalent substitutions, improvements, etc. made within the spirit and principle of the disclosed embodiments are intended to be included within the scope of protection of the disclosed embodiments.

What is claimed is:

1. An apparatus for sorting and conveying, comprising:
    a cargo carrying assembly;
    a conveying assembly, configured to drive the cargo carrying assembly to move; wherein, the conveying assembly comprises a sprocket set and a chain drivingly connected to the sprocket set, the chain is pivotally connected with a roller, and the sprocket set is configured to be engaged with the roller to drive the cargo carrying assembly to move circularly; and
    a bearing assembly, disposed adjacent to the sprocket set and configured to bear the roller in response to the roller to be engaged with or disengaged from the sprocket set;
    wherein the bearing assembly comprises:
    a first bearing member, disposed adjacent to an upper portion of a driving sprocket in the sprocket set; wherein the first bearing member is in a plate shape and is provided with a first notch, and the first notch is configured to accommodate a part of sprocket teeth of the driving sprocket; and in response to the roller being engaged and not completely engaged with the driving sprocket, the driving sprocket is engaged with a part of the roller, and the first bearing member bears another part of the roller; and
    a second bearing member, disposed adjacent to a lower portion of the driving sprocket and configured to bear the roller in response to the roller to be disengaged from the driving sprocket.

2. The apparatus for sorting and conveying according to claim 1, wherein the first bearing member comprises a first rectangular plate and a second rectangular plate, a length of the first rectangular plate is smaller than a length of the second rectangular plate, and an end of the first rectangular plate is aligned with an end of the second rectangular plate; and
    a region where another end of the first rectangular plate and another end of the second rectangular plate are staggered forms the first notch;
    wherein, in response to the roller being not engaged with the driving sprocket, the first rectangular plate and the second rectangular plate jointly bear the roller; and in response to the roller being engaged and not completely engaged with the driving sprocket, the second rectangular plate bears the roller.

3. The apparatus for sorting and conveying according to claim 1, wherein the second bearing member comprises a straight segment and an arc segment, the straight segment is disposed below the driving sprocket, and the arc segment is disposed below a side of the driving sprocket.

4. The apparatus for sorting and conveying according to claim 1, further comprising:
    a tensioning assembly, disposed adjacent to a driven sprocket of the sprocket set and configured to tension the chain.

5. The apparatus for sorting and conveying according to claim 4, wherein the tensioning assembly comprises:
    a tensioning screw, wherein an end of the tensioning screw is connected to the driven sprocket;
    an adjusting nut, screwed to another end of the tensioning screw; and
    an elastic element, connected to the adjusting nut and configured to enable the driven sprocket to have a tendency of being away from the driving sprocket of the sprocket set.

6. The apparatus for sorting and conveying according to claim 4, wherein the bearing assembly further comprises:
    a first fixed bearing member, connected to a rack of the apparatus for sorting and conveying and disposed adjacent to a lower portion of the driven sprocket;
    a first movable bearing member, connected to the driven sprocket and disposed adjacent to the lower portion of the driven sprocket; wherein, the first movable bearing member is slidably connected to the first fixed bearing member and is configured to be able to move relative to the first fixed bearing member in response to the driven sprocket being away from the driving sprocket of the sprocket set.

7. The apparatus for sorting and conveying according to claim 6, wherein the first fixed bearing member is provided with a first groove, and at least part of the first movable bearing member is slidably accommodated in the first groove; and a bearing surface of the first fixed bearing member is flush with a bearing surface of the first movable bearing member.

8. The apparatus for sorting and conveying according to claim 4, wherein the bearing assembly further comprises:

a second fixed bearing member, connected to a rack of the apparatus for sorting and conveying and disposed adjacent to an upper portion of the driven sprocket; and a second movable bearing member, connected to the driven sprocket and disposed adjacent to the upper portion of the driven sprocket; wherein, the second movable bearing member is slidably connected to the second fixed bearing member and is configured to be able to move relative to the second fixed bearing member in response to the driven sprocket being away from the driving sprocket of the sprocket set.

9. The apparatus for sorting and conveying according to claim 8, wherein the second fixed bearing member is provided with a second groove, and at least part of the second movable bearing member is slidably accommodated in the second groove; and a bearing surface of the second fixed bearing member is flush with a bearing surface of the second movable bearing member.

10. The apparatus for sorting and conveying according to claim 8, wherein the second fixed bearing member and the second movable bearing member form a second notch, and the second notch is configured to accommodate a part of sprocket teeth of the driven sprocket.

11. The apparatus for sorting and conveying according to claim 1, further comprising:

a guide assembly, configured to guide the roller to engage with the sprocket set.

12. The apparatus for sorting and conveying according to claim 11, wherein the guide assembly comprises:

a first guide member, disposed adjacent to the driving sprocket of the sprocket set and configured to guide the roller to engage with the driving sprocket; and a second guide member, disposed adjacent to the driven sprocket of the sprocket set and configured to guide the roller to engage with the driven sprocket.

13. The apparatus for sorting and conveying according to claim 1, wherein the roller is pivoted together with two adjacent links of the chain.

14. The apparatus for sorting and conveying according to claim 1, wherein the driving sprocket is disposed at an end of the apparatus for sorting and conveying, and a driven sprocket in the sprocket set is disposed at another end of the apparatus for sorting and conveying.

15. The apparatus for sorting and conveying according to claim 2, wherein the another end of the second rectangular plate extends substantially to a center line of the driving sprocket.

16. The apparatus for sorting and conveying according to claim 15, wherein the center line is perpendicular to the second rectangular plate.

17. The apparatus for sorting and conveying according to claim 4, wherein the tensioning assembly pushes against the driven sprocket enabling the driven sprocket to move toward a direction away from the driving sprocket.

18. The apparatus for sorting and conveying according to claim 5, wherein a blocking piece is provided between an end of the elastic element and the adjusting nut.

\* \* \* \* \*